(12) United States Patent
Nolan

(10) Patent No.: US 8,183,806 B2
(45) Date of Patent: May 22, 2012

(54) BACK EMF SENSING INTERFACE CIRCUIT

(75) Inventor: Dennis C. Nolan, Elk Grove Village, IL (US)

(73) Assignee: STMicroelectronics, Inc., Carrollton, TX (US)

( * ) Notice: Subject to any disclaimer, the term of this patent is extended or adjusted under 35 U.S.C. 154(b) by 495 days.

(21) Appl. No.: 12/480,457

(22) Filed: Jun. 8, 2009

(65) Prior Publication Data

US 2010/0308758 A1 Dec. 9, 2010

(51) Int. Cl.
*H02P 6/00* (2006.01)

(52) U.S. Cl. ............... 318/400.34; 318/400.35; 361/159; 323/282; 323/283; 323/284; 323/274

(58) Field of Classification Search ............. 318/400.34, 318/400.35; 323/282–284, 274; 361/159
See application file for complete search history.

(56) References Cited

U.S. PATENT DOCUMENTS

| | | | | |
|---|---|---|---|---|
| 4,347,544 A | * | 8/1982 | Ohba | 361/154 |
| 5,773,965 A | * | 6/1998 | Hayashi | 323/222 |
| 5,796,223 A | * | 8/1998 | Ohtsuka et al. | 318/126 |
| 5,982,604 A | * | 11/1999 | Kojima et al. | 361/159 |
| 7,129,759 B2 | * | 10/2006 | Fukami | 327/110 |
| 7,576,964 B2 | * | 8/2009 | Nakahara | 361/91.1 |

* cited by examiner

*Primary Examiner* — Rita Leykin

(74) *Attorney, Agent, or Firm* — Gardere Wynne Sewell LLP

(57) ABSTRACT

A back EMF signal from PWM driven motor is passed through an attenuation circuit. The attenuation circuit has a first mode of operation and a second mode of operation. The first mode of operation, used to sample a higher voltage back EMF signal during PWM on-time, applies the back EMF signal to a resistive divider formed of a first resistor and second resistor connected in series. The second mode of operation, used to sample a lower voltage back EMF signal during PWM off-time, applies the back EMF signal to a circuit comprised of a transistor conduction path in series with the second resistor. A control signal, responsive PWM on-time and off-time state, controls switching between the first and second modes.

26 Claims, 2 Drawing Sheets

BACK EMF SENSING INTERFACE CIRCUIT

BACKGROUND OF THE INVENTION

1. Technical Field of the Invention

The present invention relates generally to sensing motor back EMF signal zero crossing events.

2. Description of Related Art

In the course of operating and controlling brushless DC (BLDC) type motors it is often necessary to monitor the voltage at the motor terminals in order to determine the instant in time that this voltage changes polarity with respect to the circuit common. This event is called the zero crossing. When employing modern control circuitry, this task is often accomplished by connecting these signals to the Analog to Digital Converter (ADC) input pins of a micro processor. The problem which is faced in connecting these signals to the micro processor is that the voltage level of these signals is often quite high, commonly near 350 Volts, while the highest voltage level that can be safely connected to the micro processor is normally in the range of 3 to 5 Volts. It is necessary to protect the control circuitry from damage due to the high voltage while preserving the integrity of the signal so that it can be used for control sensing purposes.

A method which has been used previously to address this problem is to couple the motor terminal signal to the sensing circuit through a resistive attenuator circuit. An example of such an attenuator circuit is shown in FIG. 1. The resistive attenuator circuit is, in this example, a common resistive divider. One resistive divider is provided for each sensed phase (PHA, PHB and PHC) of the three-phase motor. In a typical case, if the terminal voltage may be as high as 350 Volts and the maximum allowable voltage at the micro processor is only 5 Volts, then the attenuation factor of the circuit must be 70:1 or greater.

The foregoing attenuation factor poses a significant limitation because much of the signal strength is lost in the attenuator circuit. At high motor speeds, the BEMF signal present at the terminals is proportionately high so that, even with high attenuation, sufficient signal strength is presented to the control circuitry so that a valid zero crossing detection can be obtained. However, at relatively low motor speeds, the signal which is left after attenuation will not have sufficient strength to obtain a reliable zero crossing detection.

If the motor phase signal can be safely coupled to the control circuitry without attenuation then sensing of the BEMF signal can be obtained at considerably lower speeds. This increases the operational speed range of a sensorless BLDC motor drive system and is very desirable.

Another technique which has been previously used to couple the terminal voltage to the sensing circuitry in a safe manner is to employ a diode clamping circuit. An example of such a circuit is shown in FIG. 2. The circuit includes a current limiting resistor in series with a Zener diode. One such circuit is provided for each sensed phase (PHA, PHB and PHC) of the three-phase motor. In an alternative implementation, two diodes could be used for connecting to safe voltage reference levels. This circuit does not reduce the base signal level as does the resistive attenuator so operation at relatively low speeds is preserved. Since the sensing circuitry (in this case the micro processor) is only looking for the time of the zero crossing, it is not a concern that the signal is "clamped" to levels no higher than the zener breakdown voltage (normally about 5 Volts) and no more negative than the forward voltage of the diode (about 0.7 Volt).

The major problem encountered with the circuit of FIG. 2 is the very high power dissipation encountered in the current limiting resistor. Many micro processors require that the equivalent source resistance of circuits which connect to their ADC inputs should be no higher than 10K ohms in order to get good results. If a value of 10K ohms is used, and the terminal voltage goes to 350 Volts, then the instantaneous power dissipation of the resistor is 11.9 Watts. This power dissipation level is very high and it is not practical to design a circuit in this manner. For motors operating at significantly lower voltages, however, this circuit can be economical and efficient.

A need exists in the art which addresses the deficiencies of the prior art circuits of FIGS. 1 and 2.

SUMMARY OF THE INVENTION

The proposed circuit protects control circuitry from damage due to high voltage while preserving the integrity of the signal so that it can be used for control sensing purposes.

In an embodiment, a circuit comprises: a first transistor having a first conduction terminal configured to receive a back EMF signal and having a second conduction terminal and a control terminal; a circuit configured for biasing the control terminal of the first transistor; a capacitor coupled between the control terminal and a reference voltage terminal; a first resistor coupled between the second conduction terminal and the reference voltage terminal; a second resistor coupled between the second conduction terminal and an output signal node; and a first diode coupled between the output signal node and the reference voltage terminal.

In an embodiment, a circuit comprises: an attenuation circuit configured to receive a back EMF signal and output an attenuated back EMF signal, the attenuation circuit having a first attenuation configuration and a second attenuation configuration, the configuration being selected by a logic state of a control signal; the attenuation circuit first attenuation configuration being operable in the first mode of operation responsive to the control signal having a first logic state to attenuate a higher voltage back EMF signal; and the attenuation circuit second attenuation configuration being operable in the second mode of operation responsive to the control signal having a second logic state to attenuate a lower voltage back EMF signal.

In an embodiment, a method comprises: receiving a back EMF signal; and attenuating the received back EMF signal to output an attenuated back EMF signal; wherein attenuating comprises: applying a first attenuation to the received back EMF signal to sample BEMF during PWM on-time; and applying a second attenuation to the received back EMF signal to sample BEMF during PWM off-time.

In an embodiment, a circuit comprises: an attenuation circuit configured to receive a back EMF signal from a PWM driven motor and output an attenuated back EMF signal; the attenuation circuit including a first attenuation configuration operable in response to a first mode of operation to sample BEMF during PWM on-time; and the attenuation circuit including a second attenuation configuration operable in response to a second mode of operation to sample BEMF during PWM off-time.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 3:
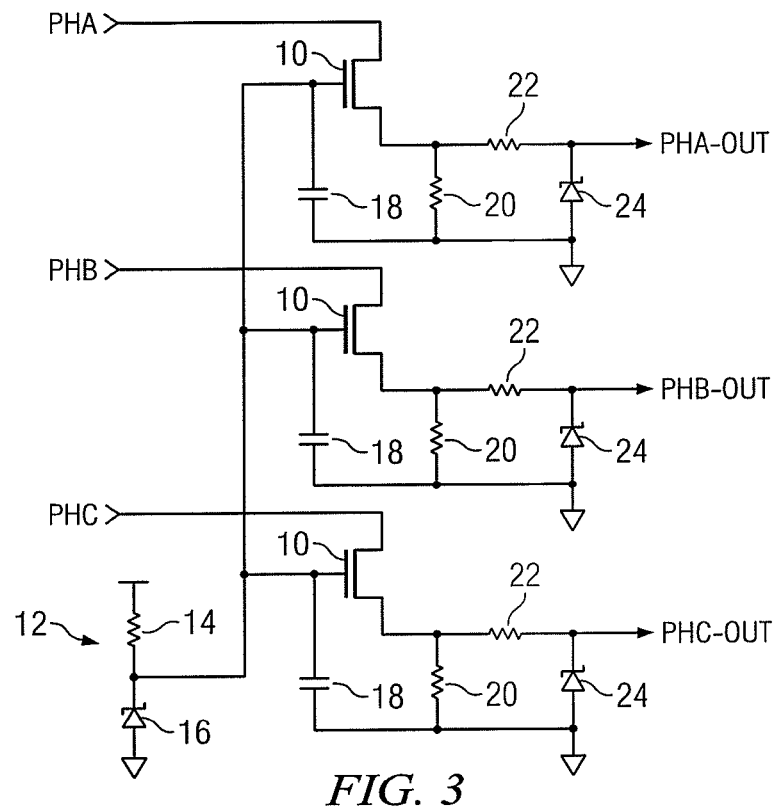
FIG. 3 is a schematic diagram of a circuit for interfacing high voltage BEMF signals to a low voltage control circuit.

Reference is made to FIG. 3 which shows a schematic diagram of a circuit for interfacing high voltage BEMF signals to a low voltage control circuit. The circuit comprises an NMOS transistor 10 having a drain terminal coupled to receive one phase of the BEMF signal. The NMOS transistor 10 may, for example, be an STQ1NK60ZR-AP transistor. Of course any suitable transistor may alternatively be used. The gate of the NMOS transistor 10 is biased by a biasing circuit 12. The biasing circuit 12 comprises a resistor 14 connected in series with a zener diode 16. The gate of the NMOS transistor 10 is coupled to a ground (reference voltage) terminal through a capacitor 18. The source of the NMOS transistor 10 is coupled to the ground terminal through a resistor 20. The source of the NMOS transistor 10 is also coupled to an output node through a resistor 22. The output node is coupled to the ground terminal through a zener diode 24. One circuit is provided for each motor phase (PHA, PHB, PHC). One biasing circuit 12 can be used for all three included circuits.

A primary objective of the circuit of FIG. 3 is to present a low source impedance at the output node to the ADC inputs of the processor, which would receive the output signals, while keeping circuit power dissipation low. In operation, the gate of the NMOS transistor 10 is held constant by the biasing circuit 12 at about 10V. In this way, the source voltage could not possibly go above 10V since there would no longer be a positive Vgs to turn on the transistor 10. In practice, as the input voltage rises from zero, the source voltage will follow it, essentially 1:1, until the input gets to about 6V. After this, since the gate threshold of the NMOS transistor 10 is about 4V, the source will remain at 6V, becoming essentially a source follower, "following" the fixed 10V on the gate. The additional resistor/zener clamp at the source of the NMOS 10 (formed by resistor 22 and zener 24) is added as insurance for the case of very high dv/dt transients at the input which may couple into the gate circuit, allowing the source to exceed 6V for a very, very short transient. It should be noted that even though power dissipation is very low (¼ Watt resistors can be used), the source impedance is kept low as well.

The purpose of the capacitor 18 connected from the gate of the NMOS transistor 10 to the ground terminal is to eliminate voltage spikes at the MMOS transistor 10 source due to fast transients at the input. This additional circuitry eliminates the spikes at the source. In fact, even without the capacitor 18, the resistor 22 and zener 24 would function to remove spikes such that they are not observed at the output node.

The circuit of FIG. 3 is intended for synchronous sampling of the motor BEMF during the OFF portion of the motor driving inverter bridge's Pulse Width Modulation (PWM) cycle. In this operating mode, the processor will compare the sampled signal with a very low threshold value (essentially zero) in order to determine the time of the zero crossing event. Sampling of the BEMF signal during Toff provides the best signal sensitivity (strength) and is the preferred method at low motor speeds.

As motor speed increases and PWM duty cycles approach 100% the available off time sampling window will become so short that the circuit of FIG. 3 cannot reliably function to output the sensed parameter. As the duty cycle approaches 100%, it becomes advantageous to sample BEMF during the PWM ON time (Ton). It can be shown by circuit analysis, and is well known, that if the BEMF sample taken during ON time is compared against a threshold equivalent to one half of the inverter bus supply voltage, then the same "zero crossing" time event can be detected.

Figure 4:
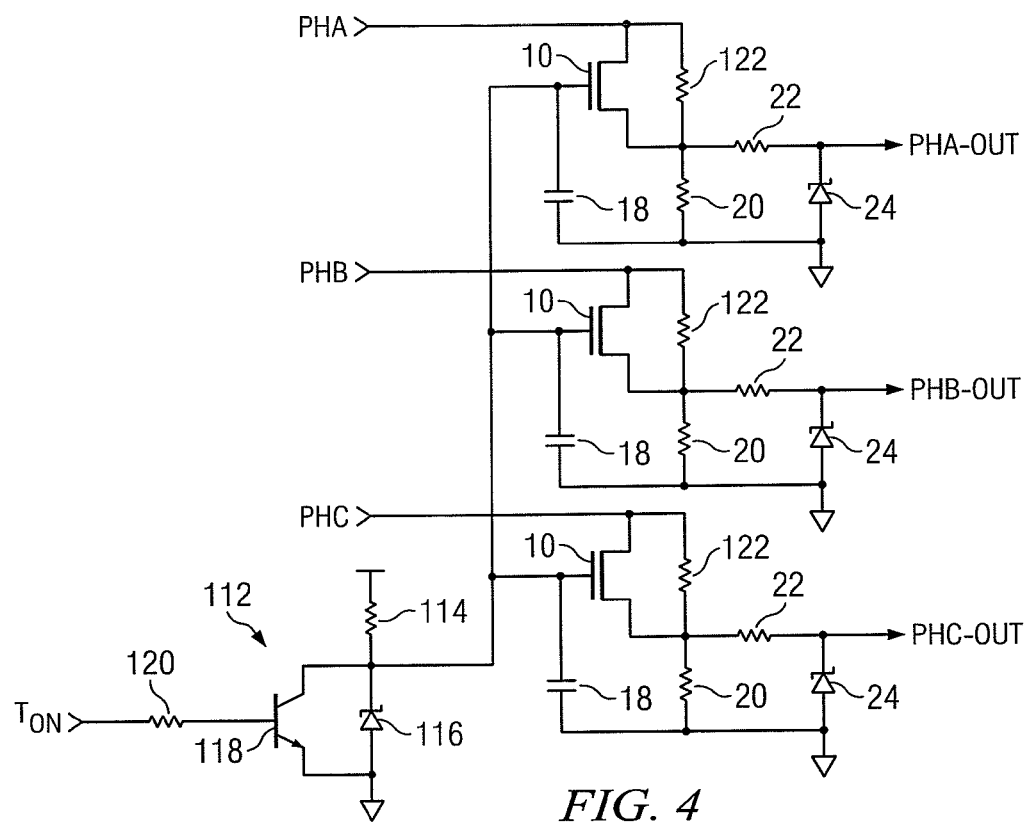
FIG. 4 is a schematic diagram of a circuit for interfacing high voltage BEMF signals to a low voltage control circuit.

The circuit of FIG. 3 can be further improved to support sampling of BEMF during the PWM ON time. The improved circuit is shown in FIG. 4. The circuit comprises an NMOS transistor 10 having a drain terminal coupled to receive one phase of the BEMF signal. The NMOS transistor 10 may, for example, be an STQ1NK60ZR-AP transistor. Of course any suitable transistor may alternatively be used. The gate of the NMOS transistor 10 is biased by a biasing circuit 112. The biasing circuit 112 comprises a resistor 114 connected in series with a zener diode 116. The biasing circuit 112 further includes bipolar npn transistor 118 having a collector terminal connected to the series interconnection node between the resistor 114 and zener 116. The emitter of the bipolar transistor 118 is coupled to the ground terminal. The base of the bipolar transistor 118 is coupled through a series resistor 120 to receive a control signal Ton. The gate of the NMOS transistor 10 is coupled to a ground terminal through a capacitor 18. The source of the NMOS transistor 10 is coupled to the ground terminal through a resistor 20. A resistor 122 is coupled between the source and drain of the NMOS transistor 10. The source of the NMOS transistor 10 is also coupled to an output node through a resistor 22. The output node is coupled to the ground terminal through a zener diode 24. One circuit is provided for each motor phase. One biasing circuit 112 can be used for all three included circuits.

Figure 1:
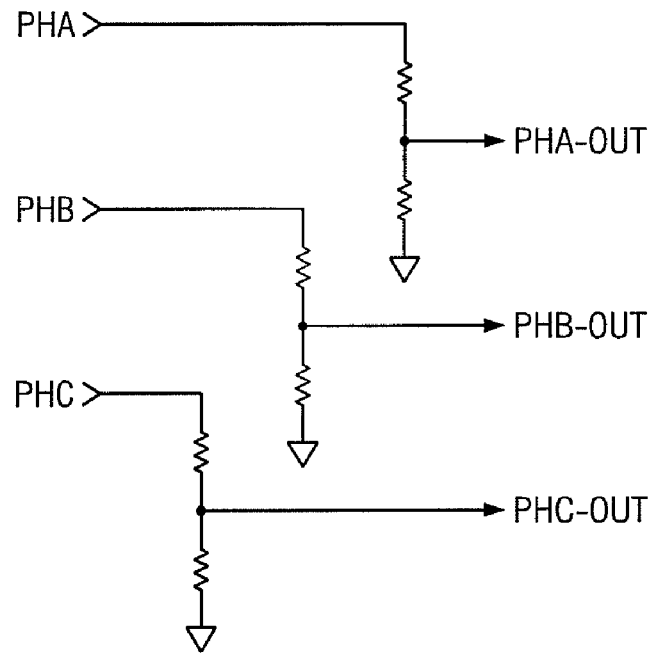
FIG. 1 is a schematic diagram of a prior art attenuator circuit.
Figure 2:
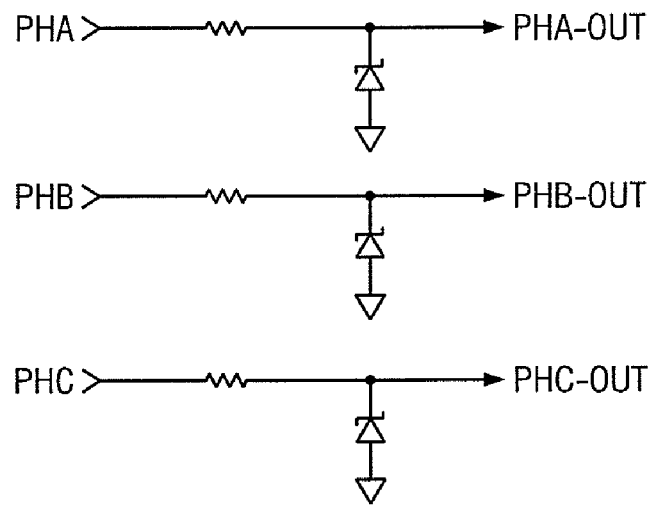
FIG. 2 is a schematic diagram of a prior art diode clamping circuit.

In comparing the circuit of FIG. 4 to the circuit of FIG. 3, it will be noted that additional circuitry has been added to allow for controlling the sampling operation by the circuit during either the ON or OFF portion of the motor PWM control waveform. If the control input Ton is logic high (indicating PWM ON time), then the gate of the NMOS transistor 10 is driven toward ground (i.e., zero volts), essentially removing the NMOS transistor 10 from the circuit. This leaves a straight resistive attenuator, like that of prior art FIG. 1, designed for a 400V max input formed by the resistor 122 and resistor 20. In this circuit, the resistor 122 should have a higher power rating (for example, while a ¼ Watt may be sufficient, it may be preferred to have a ½ Watt rating). Conversely, if the control input Ton is logic low (indicating PWM OFF time), then the NMOS transistor 10 is turned on. This shunts resistor 122 and provides an interface circuit as shown in FIG. 3.

The Toff circuit (of the FIG. 3 configuration) works equally well for bus voltages (BEMF signals) from as low as 12 Volts to as high as 340 Volts. However, in the FIG. 4 circuit implementation, the resistance value for the resistor 122 must be adjusted for the voltage of the BEMF signal in order to optimize circuit operation.

Although the preferred implementation of FIG. 4 uses MOS and bipolar transistors as shown, it will be understood that the bipolar transistor 118 could alternatively be implemented as a MOS device.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A circuit, comprising:
   a first transistor having a first conduction terminal configured to receive a back EMF signal and having a second conduction terminal and a control terminal;
   a circuit configured for biasing the control terminal of the first transistor;
   a capacitor coupled between the control terminal and a reference voltage terminal;
   a first resistor coupled between the second conduction terminal and the reference voltage terminal;
   a second resistor coupled between the second conduction terminal and an output signal node; and
   a first diode coupled between the output signal node and the reference voltage terminal.

2. The circuit of claim 1 wherein the circuit configured for biasing the control terminal of the first transistor comprises a third resistor coupled in series with a second diode.

3. The circuit of claim 2 wherein the second diode is a zener diode.

4. The circuit of claim 1 wherein the circuit configured for biasing the control terminal of the first transistor comprises a third resistor coupled in series with a second diode and a second transistor coupled to shunt the second diode in response to a control signal having a first logic state.

5. The circuit of claim 4 wherein the second diode is a zener diode.

6. The circuit of claim 4 further comprising a fourth resistor coupled between the first and second conduction terminals of the first transistor.

7. The circuit of claim 4 wherein the second transistor is a bipolar transistor.

8. The circuit of claim 1 wherein the first transistor is a MOS transistor.

9. A circuit, comprising:
   an attenuation circuit configured to receive a back EMF signal and output an attenuated back EMF signal, the attenuation circuit having a first attenuation configuration and a second attenuation configuration, the configuration being selected by a logic state of a control signal;
   the attenuation circuit first attenuation configuration being operable responsive to the control signal having a first logic state to attenuate a higher voltage back EMF signal; and
   the attenuation circuit second attenuation configuration being operable responsive to the control signal having a second logic state to attenuate a lower voltage back EMF signal.

10. The circuit of claim 9 wherein the higher voltage back EMF signal is in the hundreds of volts and the lower voltage back EMF signal is in the tens of volts.

11. The circuit of claim 9 wherein the attenuation circuit comprises:
    a resistive divider formed of a first resistor and a second resistor connected in series, a first terminal of the first resistor configured to receive the back EMF signal, a second terminal of the first resistor and a first terminal of the second resistor connected together, and a second terminal of the second resistor coupled to a ground terminal; and
    a first transistor having a first conduction terminal connected to the first terminal of the first resistor and having a second conduction terminal connected to the second terminal of the first resistor and having a control terminal.

12. The circuit of claim 11 wherein in the first attenuation configuration the first transistor is biased to an off condition and attenuation is provided by the resistive divider, and wherein in the second attenuation configuration the first transistor is biased to an on condition and attenuation is provided by the first transistor and the second resistor.

13. The circuit of claim 11 further comprising a capacitor coupled between the control terminal of the first transistor and the ground terminal.

14. The circuit of claim 11 further comprising a third resistor coupled between the second conduction terminal of the first transistor and an output node for the attenuated back EMF signal and a first diode coupled between the output node and the ground terminal.

15. The circuit of claim 11 further comprising a fourth resistor coupled in series with a second diode and a second transistor coupled to shunt the second diode in response to the control signal having a first logic state.

16. A method, comprising:
    receiving a back EMF signal; and
    attenuating the received back EMF signal to output an attenuated back EMF signal;
    wherein attenuating comprises:
       applying a first attenuation to the received back EMF signal to sample BEMF during PWM on-time; and
       applying a second attenuation to the received back EMF signal to sample BEMF during PWM off-time.

17. The method of claim 16 wherein the first attenuation is applied to the received back EMF signal to attenuate a higher voltage back EMF signal, and the second attenuation is applied to the received back EMF signal to attenuate a lower voltage back EMF signal.

18. The method of claim 17 wherein the higher voltage back EMF signal is in the hundreds of volts and the lower voltage back EMF signal is in the tens of volts.

19. The method of claim 16 wherein the first attenuation is provided by resistive divider formed from a first resistor and a second resistor connected in series, and wherein the second attenuation is provided by a transistor and the second resistor connected in series.

20. A circuit, comprising:
    an attenuation circuit configured to receive a back EMF signal from a PWM driven motor and output an attenuated back EMF signal;
    the attenuation circuit including a first attenuation configuration operable in response to a first mode of operation to sample BEMF during PWM on-time; and
    the attenuation circuit including a second attenuation configuration operable in response to a second mode of operation to sample BEMF during PWM off-time.

21. The circuit of claim 20 wherein the received back EMF signal during PWM on-time has a higher voltage in the hundreds of volts and the received back EMF signal during PWM off-time has a lower voltage in the tens of volts.

22. The circuit of claim 20 wherein the attenuation circuit comprises:
    a resistive divider formed of a first resistor and a second resistor connected in series, a first terminal of the first resistor configured to receive the back EMF signal, a second terminal of the first resistor and a first terminal of the second resistor connected together, and a second terminal of the second resistor coupled to a ground terminal; and
    a first transistor having a first conduction terminal connected to the first terminal of the first resistor and having a second conduction terminal connected to the second terminal of the first resistor and having a control terminal.

23. The circuit of claim 22 wherein in the first attenuation configuration the first transistor is biased to an off condition during PWM on-time and attenuation is provided by the resistive divider, and wherein in the second attenuation configuration the first transistor is biased to an on condition during PWM off-time and attenuation is provided by at least the first transistor and the second resistor.

24. The circuit of claim 22 further comprising a capacitor coupled between the control terminal of the first transistor and the ground terminal.

25. The circuit of claim 22 further comprising a third resistor coupled between the second conduction terminal of the first transistor and an output node for the attenuated back EMF signal and a first diode coupled between the output node and the ground terminal.

26. The circuit of claim 22 further comprising a fourth resistor coupled in series with a second diode and a second transistor coupled to shunt the second diode during PWM on-time.

* * * * *